Aug. 23, 1966  W. O. WEBBER ETAL  3,268,420
PROCESS FOR CONTROLLING THE LOADING AND HEAT INPUT OF
FRACTIONATING COLUMNS
Filed Dec. 27, 1961
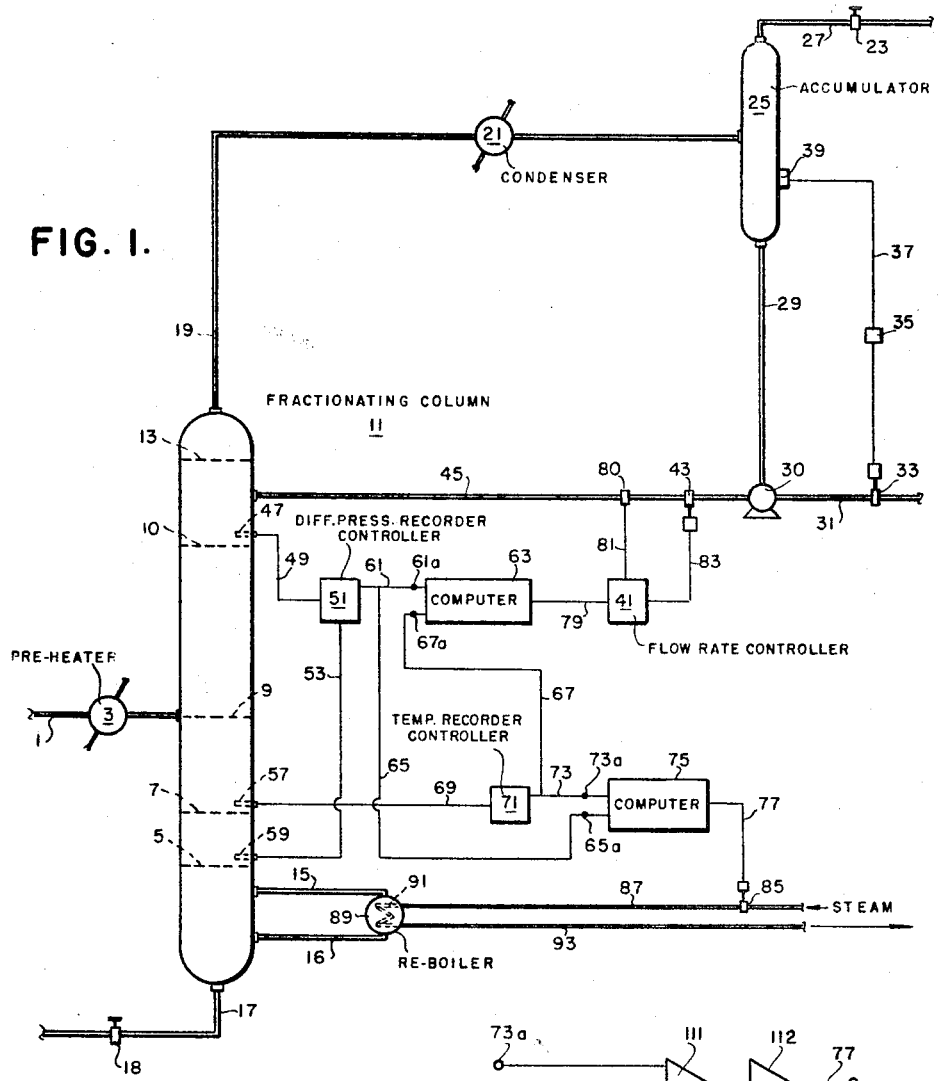
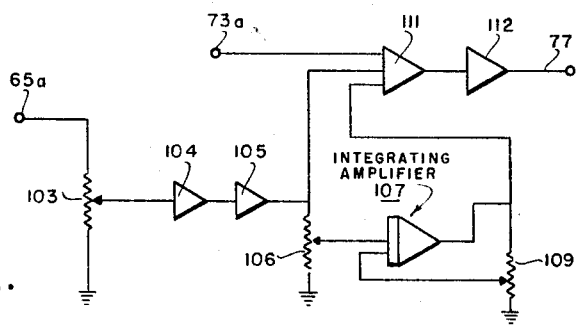
INVENTORS.
ROBERT L. MARTIN,
WILLIAM O. WEBBER,
BY John B. Davidson
ATTORNEY.

United States Patent Office 3,268,420
Patented August 23, 1966

3,268,420
PROCESS FOR CONTROLLING THE LOADING AND HEAT INPUT OF FRACTIONATING COLUMNS
William O. Webber and Robert L. Martin, Baytown, Tex., assignors, by mesne assignments, to Esso Research and Engineering Company, Elizabeth, N.J., a corporation of Delaware
Filed Dec. 27, 1961, Ser. No. 162,403
5 Claims. (Cl. 203—2)

This invention relates to the control of the operation of a fractionating column, and more particularly to the control of a fractionating column in a manner that permits maximum stabilization of the operating characteristics thereof.

In a usual fractionating system utilizing a multiplate fractionating column, a mixed or multicomponent feedstock is charged to approximately the midpoint of the fractionating column. The column is a vertically disposed chamber having a plurality of vertically spaced-apart fractionating plates or bubble cap trays disposed therein. The fractionating plates are adapted to hold feedstock components as a liquid and are provided with means for passing vaporized feedstock upwardly therethrough. The liquid components flow downwardly through the column, and the vaporized components ascend upwardly through the column. The rate of ascent of vaporized material is governed by a number of factors, one of the most important of which is the load on the column. If too great a load is placed on the column, the vaporized material may entrain excessive amounts of liquefied material, and the liquid-handling capacity of the column may be exceeded. Unless the operating conditions of the column are corrected, flooding of the column may occur, with resulting spillover of liquid materials, or the production capabilities of the column may not be realized.

For the purpose of regulating the loading of the column, maintaining a proper heat balance in the fractionating column, and generally to facilitate rectification of the components within the column, reflux is normally returned to the upper portion of the column in a regulated quantity. The heat applied to the column, the products taken from the column, and the reflux return to the column must be in very critical balance in order to effect maximum separation of the components of the feedstock and to prevent product loss by spillage of the liquefied material in the fractionating plates.

There are many operating variables that must be taken into consideration in connection with the operation of the fractionating column. Among these variables are the quantity and temperature of the feedstock, the ambient temperatures of the atmosphere, the quantity and temperature of cooling water used in condensing the overhead products from the column, the quantity and temperature of steam used for reboiling the liquid components at the bottom of the column to regulate heat input, and the quantity of reflux and the quantity of products withdrawn from the fractionating system.

In the operation of a fractionating column there is always a difference in pressure between the top and bottom of the column. The pressure drop across the column is a function of a number of variables such as overhead product rate, reflux rate and temperature, and feed rate. Assuming a given feed rate, a given overhead product rate, and a given reflux rate and temperature, the pressure drop across a given column is relatively constant. Therefore, the load on the column, which can be readily controlled by varying the reflux rate, can be measured by measuring the pressure drop across the column.

It is normal to exert primary control on the operation of the column by varying the quantity of reflux and the quantity of heat supplied to the column by the reboiler system associated therewith. Any disturbance affecting the operation of the column, such as the change in feed rate, composition, or temperature, or changes in the ambient atmospheric temperature, calls for both a new reflux rate and a new bottoms heat input to maintain optimum heat balance and load on the column. In most systems for fractionating column control, primary control is exerted on either the heat input or the reflux rate. Unfortunately, any action taken to vary either the heat input or the reflux rate affects the other after a characteristic delay time, such that many adjustments may have to be made before the system is brought back into proper balance. As a result, fractionating columns usually operate at substantially below their maximum capacity in an effort to insure that there will be no spillover as the result of unforeseen changes in system operating conditions. In addition, fractionating columns seldom produce a product of target quality for greater than 95% of time of total operation, and more often columns produce product of a target quality at between 80% and 90% of total operating time. Manifestly, it is desirable to increase the percentage of total operating time over which product of target quality is produced.

In accordance with the teachings of the present invention, the heat input to a fractionating column is controlled in accordance with both the heat balance of the fractionating system and in accordance with variations in the loading on the column, the control effect exerted as the result of a given change in the loading on the column decaying exponentially as a function of time from that given change. Further, the reflux to the column is regulated in accordance with the loading on the column, and in accordance with changes in the heat balance of the column, the control effect exerted as the result of a given change in the heat balance of the column decaying exponentially as a function of time from that given change. Thus, changes in either the heat balance or the loading on the fractionating column will result in both a variation in the heat input to, and in the reflux returned to the column. It has been found that the stability of operation of a fractionating column is unexpectedly improved by having the control effect of the control variables decay exponentially in the manner set forth above, such that the operation of the tower can be increased to substantially its theoretical maximum capacity.

Objects and features of the invention not apparent from the above discussion will become evident upon consideration of the following detailed description thereof taken in connection with the accompanying drawing, wherein:

FIG. 1 is a schematic flow diagram illustrating a preferred embodiment of the invention; and FIG. 2 is a schematic diagram of an electrical circuit suitable for use as the analog computer 63 designated in FIG. 1.

With reference now to the embodiment of the invention shown in FIG. 1, there is designated a fractionating column 11 which is of the conventional type utilizing a multiplicity of vertically stacked fractionating plates, also termed bubble trays or bell cap trays. Only five of the fractionating plates are illustrated and are designated by reference numerals 5, 7, 9, 10, and 13. Feedstock from line 1 is passed through a preheater 3 before being introduced into the fractionating plate 9. A bottoms product line 17 is connected to the lower end of the fractionating column 11 from which the heavy liquid bottoms product may be carried from the tower. A valve 18, which may be manually controlled or automatically controlled, is connected in bottoms line 17 for controlling the flow rate of bottoms products from the column.

A reboiler system is provided which may be either of the internal or external type. The reboiler system shown in the drawings is of the external type and includes a reboiler drum 89, a line 16 for conducting liquids in the bottom of the fractionating column to the drum 89, and a line 15 for returning heated liquids to the fractionating column 11. A steam line 87 conducts steam from a suitable source (not shown) to heating coils 91 within the drum 89, and line 93 returns steam and liquid to the steam source. A valve 85 in line 87 is provided for controlling the quantity of steam supplied to the coils 91.

The vaporized products from the column pass through an overhead products line 19 and are condensed by condenser 21 before being introduced into the condensate receiver or accumulator 25. Cold water may be supplied to the condenser 21 in the usual manner. The quantity of cold water supplied to condenser 21 may be either manually or automatically controlled.

Uncondensed vapors and gases from condensate receiver 25 are vented through line 27 and control valve 23 while the resulting condensed overhead products stream is withdrawn from the lower end of condensate receiver 25 by way of line 29, pump 30, line 31, and control valve 33. A portion of the liquid condensate is returned to the upper portion of the column 11 as reflux through line 45 and valve 43. The quantity of condensate passing from the system by way of line 31 is regulated by liquid level controller 35 connected to a liquid level detector 39 in condensate receiver 25. The liquid level controller may be connected to the liquid lever detector 39 by electrical or pneumatic connection 37, and to valve 33 by an electrical, mechanical, or pneumatic connection 38. Alternatively, the amount of liquid product withdrawn through line 31 may be regulated by connecting the controller 35 to a flow rate detector (not shown) in line 31. Both systems are conventional in the art and have their own advantages.

The rate of liquid flow through reflux line 45 is controlled by a flow rate detector 80 in line 45, connected by lead or line 81 to a flow rate controller 41. The flow rate controller 41 is connected to valve 43 by an electrical, mechanical, or pneumatic connection 83 so as to regulate the position of the valve stem thereof. The controller 41 may be any of a number of types known to the art wherein the desired flow rate is determined by a manual setting, or by hydraulic or electrical signals such as may be supplied by line 79, which is compared against the actual flow rate detected by detector 80 to produce a correcting output indication to a valve controlled thereby. Such devices are well known in the art and will not be further discussed herein.

For the purpose of detecting the loading on the column, the total pressure across the column is measured. This is done by inserting suitable pressure detecting devices 59 and 47 near the bottom and near the top of the column, respectively, and connecting them as by leads 49 and 53 to a suitable differential pressure recorder-controller 51. The differential pressure recorder-controller 51 may be of the type manufactured by Foxboro Instrument Company, Model 58, which is adapted to provide an output signal variable in accordance with differences in pressures detected by apparatus connected thereto. The output signal may be pneumatic or electrical in accordance with the type of apparatus used. As indicated, the pressures are measured above topmost and bottommost fractionating plates 5 and 10; other plates may be used for this purpose provided a pressure difference representative of the loading on the column is obtained thereby.

For the purpose of detecting the heat input to the fractionating system, a temperature sensing device, such as a thermocouple 57, is positioned above a fractionating plate 7 in the column. The particular location of the temperature sensing device 57 is not particularly critical, but, if it is located in the lower section below the feed line 1, it is preferable to have the device near the lower end of the column between the surface of liquids in the bottom of the column and the fractionating plate 9 into which feedstock is injected. The output indication of the temperature sensing device 57 is coupled to a temperature recorder-controller 71 by lead or line 69.

Further included in the system are a pair of analog computers 63 and 75. The function of analog computer 63 is to supply a signal to flow rate controller 41 for setting the flow rate controlled by the controller in accordance with the load on the fractionating column as indicated by the output signal from recorder-controller 51, and in accordance with variations in the heat balance of the column as indicated by the output signal from recorder-controller 71. The analog computer 63 further is designed to modify its output signal so that the effect thereon of a change in the signal supplied thereto by recorder-controller 71 is reduced exponentially as a function of time from the instant of that given change. More specifically, the analog computer 63 computes the mathematical relationship $$X_1 = Y + \frac{K_1 \Delta Z}{e^{K_2 t_1}}$$

where $X_1$ is the output of the computer, $Y$ is indicative of the differential pressure (i.e., the output signal of recorder-controller 51), $Z$ is indicative of the heat balance of the column (i.e., the output signal of recorder-controller 71), $t_1$ is time measured from a given variation in the output signal of recorder-controller 71, and $K_1$ is a constant dependent on the steady state characteristics of the fractionating column, and $K_2$ is a constant dependent on the dynamic characteristics of the fractionating column. A suitable apparatus for use as the analog computer 63 is shown in FIG. 2 and will be described below.

The function of analog computer 75 is to provide an electrical or pneumatic output signal on line or lead 77 for controlling valve 85, variable in accordance with variations in the heat balance of the system (i.e., the output signal of recorder-controller 71) and with variations in the loading on the system (i.e., with variations in the output signal of the recorder-controller 51). The effect on the output signal of analog computer 75 brought about by a given variation in the output signal of recorder-controller 51 is decreased exponentially as a function of time from the instant of said given variation. More specifically, the analog computer computes the relationship $$X_2 = Z - \frac{K_3 \Delta Y}{e^{K_4 t_2}}$$

where $X_2$, $Y$, $Z$, $K_3$, and $K_4$ are defined as are $K_1$ and $K_2$, respectively, and $t_2$ is time measured from a given variation in the output signal of recorder-controller 51.

As shown, the output signal of recorder-controller 51 is connected to input terminal 61a of analog computer 63 by lead 61, and to input terminal 65a of analog computer 75 by lead 65. Furthermore, the output signal of recorder-controller 71 is connected to the input terminal 73a of analog computer 75 by lead 73, and to the input terminal 67a of analog computer 63 by lead 67. The output signal of the analog computer 75 is connected to valve 85 by an electrical lead or pneumatic line 77 to control the valve 85. While the analog computers 63 and 75 are described below as being electrical circuits, it is manifest that equivalent pneumatic controls can be provided.

In FIG. 2 there is illustrated an electrical circuit of an analog computer suitable for use as the analog computer 75. The analog computer includes a summing amplifier 111 adapted to produce an output signal that is indicative of the sum of a plurality of electrical signals supplied thereto. The input terminal 73a is connected directly to one of the input channels of the summing circuit 111. The signal applied to input terminal 65a is connected to another of the input channels of summing circuit 111 through a potentiometer 103 and cascade-connected amplifiers 104 and 105. The output signal from amplifier 105 also is connected to the third input channel of summing amplifier 111 through an integrating amplifier 107 which has a potentiometer 109 connected in parallel with the integrating capacitor of the amplifier so as to vary the time constant of the amplifier. A sign inverting amplifier 112 is used to couple the output signal from summing amplifier 111 to output line 77.

The operation of the circuit is as follows. Assume that a steady state signal is applied to input terminal 73. The output signal on line 77 will be directly representative of this input signal. If a transient signal appears on line 65a or if the signal applied thereto should suddenly vary, this signal will immediately be added to the signal applied to terminal 73a such that the output signal on line 77 will be indicative of their sum. The signal will be applied to the third input channel of amplifier 111 only after a delay determined by the circuit constants of amplifier 107 and potentiometer 109. As soon as this latter signal begins to be applied to the third input channel, the effect on the output signal on line 77 of the signal applied to the input terminal 65a will diminish exponentially in accordance with the characteristics of the integrating amplifier 107 as modified by the setting of the tap on potentiometer 109. After a period of time, the amplitude output signal appearing on line 77 will again be determined almost entirely by the signal appearing at input terminal 73a. In view of the fact that two amplifiers 104 and 105 are included in the circuit, the output signal appearing on line 77 will be equal to the sum of the signals appearing at terminals 73a and 65a. However, if one of the amplifiers is removed, the output signal appearing on line 77 will be indicative of the difference between the signals applied to input terminals 73a and 65a. Thus, the circuit of FIG. 2 can be made suitable for use as analog computer 63 by removing the phase-reversing amplifier 105. The constants $K_1$ and $K_3$ in the equations set forth above are set into the circuits by adjusting the tap on potentiometer 103. Furthermore, the constants $K_2$ and $K_4$ are set by adjusting potentiometers 106 and 109.

The system described above is started up in the usual manner with the analog computer disconnected from the flow rate controller 71 and the steam controller valve 85. When the system is operating smoothly at about 80% or 90% of capacity and controlled by conventional means, the potentiometers shown in FIG. 2 are adjusted to values adapted to provide about 90% of capacity for the system and the analog computers are connected in the circuit. Assume now that a change in one of the operating variables, such as the temperature of the feed stream, brings about a change in the heat balance of the system. This will be detected by thermocouple 57 to vary the output signal of the analog computer 75. If there is a decrease in the heat content of the feed stream, the output signal from analog computer 75 will be such as to open valve 85 and increase the heat supplied to reboiler 89 so as to increase the temperature of the liquid in the bottom of the fractionating column. Simultaneously, a signal will be applied to analog computer 63 operative to decrease the output signal from analog computer 63 and to decrease the flow rate of reflux through line 45 into the fractionating column. This signal will gradually return to its original value and the flow rate will return to approximately its original value as the effect of an increase in the heat supplied to the system through reboiler 89 is felt on the system. Thus, the heat balance of the upper portion of the system will be maintained substantially constant by the variation in reflux until the heat supplied to the lower portion of the system can become effective to restore the heat balance upset by the variation in temperature of the feed stream.

As another example, assume that the temperature of the cooling water supplied to condenser 21 varies to decrease the quantity of overhead products condensed thereby, and thus to decrease the liquid level in the condensate receiver 25. The rate of flow of liquid products through line 31 will be decreased by controller 35 and valve 33, decreasing the removal of run-ins from the system, thus forcing the accumulation of low boiling constituents in the column and thereby reducing the temperature therein. This reduction in temperature will be detected by thermocouple 57, and correction to the column operation will result in the same way as that described above.

As still another example, assume that it is desired to raise the pressure drop across column 11 by raising the set point on pressure drop controller 51. The resultant increased signal will appear on line 61 and operate through analog computer 63 to open valve 43 and to increase the rate of flow of reflux to the top of the fractionating column, thereby increasing the column pressure drop. Simultaneously, a signal will be applied to analog computer 75, increasing the output signal from analog computer 75 and increasing the flow rate of steam through line 87 to reboiler 89. This signal will gradually return to its original value and the flow rate will return to approximately its original value as the effect of increase in the heat supply to the system through reboiler 89 is felt on the system. Thus, the pressure drop across distillation column 11 will be raised and then maintained constant by the variation in both reflux and steam flow rates.

Under certain circumstances it may be desired to detect variations in the heat balance of the system other than by thermocouple above one of the plates. For example, assuming that the flow rate of the liquid products of the system is controlled by connecting controller 35 to a flow rate detector in line 31 rather than by connecting it to liquid level controller 39, changes in the heat balance of the system may be detected by measuring the output signal of liquid level detector 39. Thus, line 69 would be connected to liquid level detector 39 rather than to thermocouple 57. A system of this nature will be particularly advantageous where the boiling points of feedstock components to be separated are so close that temperature variations in the fractionating column are not a direct measure of the heat balance in the column. In practice, the potentiometers controlling the circuits 63 and 75 will be initially set to approximate the desired operating conditions of the system. In the light of experience in operating a particular fractionating system, it will be necessary to readjust the potentiometers, particularly potentiometer 109 of FIG. 2, to provide time delay that will result in most stable operation of the system.

In operation, the system described above has been found to be unexpectedly effective in controlling product quality and in increasing the average product output of given quality from the system. A fractionating column controlled by such a system has been found to produce product of target quality at near 100% capacity for over 99% of total operating time.

The present invention is not necessarily to be restricted to the specific structural details, arrangement of parts, or circuit connections herein set forth, as various modifications thereof may be effected without departing from the spirit and scope of the invention.

The objects and features of the invention having been completely described, what we wish to claim is:

1. In the operation of a fractionating column wherein a feedstock to be fractionated is delivered to the column at an intermediate point therein, wherein an overhead fraction is taken from the top of the column, wherein a bottoms fraction is taken from the bottom of the column, and wherein a portion of the overhead fraction is condensed and the condensate is returned to the column as reflux, the improvement comprising:

regulating heat input to the column responsive to change in temperature at a point in the column intermediate the withdrawal points and responsive to changes in the pressure differential between spaced-apart points in the column; exponentially reducing the regulation of the heat input effected as the result of any given change in said pressure differential as a function of time from the time of said given change;
regulating the loading of the column responsive to changes in said pressure differential and responsive to changes in said temperature; and exponentially reducing the regulation of the loading of the column effected in accordance with a given change in said temperature as a function of time from said given temperature variation.

2. In the operation of a fractionating column wherein a feedstock to be fractionated is delivered to the column at an intermediate point therein, wherein an overhead fraction is taken from the top of the column, wherein a bottoms fraction is taken from the bottom of the column, and wherein a portion of the overhead fraction is condensed and the condensate is returned to the column as reflux, the improvement comprising:

producing a primary signal that is a measure of temperature in the column at a point intermediate the withdrawal points and producing a secondary signal indicative of the difference in pressure between longitudinally spaced-apart points in the column;
producing a first control signal that is a measure of the sum of said primary signal and changes in said secondary signal, the effect on said first control signal of each given change in said secondary signal being exponentially reduced as a function of time from said given change;
producing a second control signal that is a measure of the difference between said secondary signal and changes in said primary signal, the effect on said second control signal of each given change in said primary signal being exponentially reduced as a function of time from said given change;
controlling the loading of said column responsive to variations in said first control signal; and
controlling the heat input to the column responsive to variations in said second control signal.

3. In the operation of a fractionating column wherein a feedstock to be fractionated is delivered to the column at an intermediate point therein, wherein an overhead fraction is taken from the top of the column, wherein a bottoms fraction is taken from the bottom of the column, and wherein a portion of the overhead fraction is condensed and the condensate is returned to the column as reflux, the improvement comprising:

producing a first control signal $X_1$ given by the relationship $$X_1 = Y + \frac{K_1 \Delta Z}{eK_2 t_1}$$

and a second control signal $X_2$ given by the relationship $$X_2 = Z - \frac{K_3 \Delta Y}{eK_4 t_2}$$

where Y is a measure of the differential pressure between longitudinally spaced-apart points in the column,
Z is a measure of the heat balance of the column at a point in the column intermediate the ends thereof,
$t_1$ is time measured from a given variation in said temperature,
$t_2$ is time measured from a given variation in said differential pressure,
$e$ is the natural logarithmic base,
$K_1$ and $K_3$ are constants dependent upon static column characteristics, and
$K_2$ and $K_4$ are constants dependent upon dynamic column characteristics;
controlling the loading on said column directly responsive to changes in said first control signal; and
controlling the heat input to said column responsive to changes in said second control signal.

4. In the operation of a fractionating column wherein a feedstock to be fractionated is delivered to the column at an intermediate point therein, wherein an overhead fraction is taken from the top of the column, wherein a bottoms fraction is taken from the bottom of the column, and wherein a portion of the overhead fraction is condensed and the condensate is returned to the column as reflux, the improvement comprising:

producing a first control signal $X_1$ given by the relationship $$X_1 = Y + \frac{K_1 \Delta Z}{eK_2 t_1}$$

and a second control signal $X_2$ given by the relationship $$X_2 = Z - \frac{K_3 \Delta Y}{eK_4 t_2}$$

where Y is a measure of the differential pressure between longitudinally spaced-apart points in the column,
Z is a measure of the heat balance of the column at a point in the column intermediate the ends thereof,
$t_1$ is time measured from a given variation in said temperature,
$t_2$ is time measured from a given variation in said differential pressure,
$e$ is the natural logarithmic base,
$K_1$ and $K_3$ are constants dependent upon static column characteristics, and
$K_2$ and $K_4$ are constants dependent upon dynamic column characteristics;
regulating the reflux to said column responsive to changes in said first control signal; and
regulating the heat input to said column responsive to changes in said second control signal.

5. In the operation of a fractionating column wherein a feedstock to be fractionated is delivered to the column at an intermediate point therein, wherein an overhead fraction is taken from the top of the column, wherein a bottoms fraction is taken from the bottom of the column, and wherein a portion of the overhead fraction is condensed and the condensate is returned to the column as reflux, the improvement comprising: producing a primary signal that is a measure of the heat balance of the column and producing a secondary signal that is a measure of the difference in pressure between longitudinally spaced-apart points in the column; producing a first control signal that is a measure of the sum of said primary signal and changes in said secondary signal; producing a second control signal that is a measure of the difference between said secondary signal and changes in said primary signal; exponentially reducing the effect of each given change in said secondary signal on said first control signal as a function of time measured from said given change; exponentially reducing the effect of each given change in said primary signal on said second control signal as a function of time measured from said given change in said primary signal; controlling the loading on said column responsive to changes in said first control signal; and controlling the heat input to the column responsive to changes in said second control signal.

References Cited by the Examiner

UNITED STATES PATENTS

| | | | |
|---|---|---|---|
| 1,942,446 | 1/1934 | Peterkin | 196—132 |
| 2,386,778 | 10/1945 | Claffey | 202—160 |
| 2,456,398 | 12/1948 | Gerhold | 202—160 |
| 2,816,858 | 12/1957 | Walker | 202—160 |
| 2,882,693 | 4/1959 | Clay | 202—160 |
| 2,963,422 | 12/1960 | Hann | 196—132 |
| 2,994,643 | 8/1961 | Smalling | 202—160 |

NORMAN YUDKOFF, *Primary Examiner.*

GEORGE D. MITCHELL, *Examiner.*

W. L. BASCOMB, *Assistant Examiner.*